(12) United States Patent
Oberle

(10) Patent No.: US 6,389,917 B1
(45) Date of Patent: May 21, 2002

(54) SAFETY DEVICE FOR A GEAR

(75) Inventor: Hans-Juergen Oberle, Rastatt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,837

(22) PCT Filed: Jul. 11, 1998

(86) PCT No.: PCT/DE98/01934

§ 371 Date: Jul. 20, 2000

§ 102(e) Date: Jul. 20, 2000

(87) PCT Pub. No.: WO99/30056

PCT Pub. Date: Jun. 17, 1999

(30) Foreign Application Priority Data

Dec. 6, 1997 (DE) .......................................... 197 54 260

(51) Int. Cl.[7] ................................................. F16H 1/02
(52) U.S. Cl. ............................... 74/412 TA; 192/223.1; 464/32
(58) Field of Search ..................... 74/412 TA; 192/223, 192/223.1; 464/32; 297/216.18

(56) References Cited

U.S. PATENT DOCUMENTS

| | | | | |
|---|---|---|---|---|
| 3,975,923 A | * | 8/1976 | Grimpe | 64/28 R |
| 4,218,896 A | * | 8/1980 | van der Lely | 64/28 R |
| 4,763,768 A | * | 8/1988 | Flaig et al. | 192/150 |
| 5,005,906 A | * | 4/1991 | Suzuki et al. | 297/362 |
| 6,059,085 A | * | 5/2000 | Farnsworth | 192/55.1 |

* cited by examiner

*Primary Examiner*—David Fenstermacher
(74) *Attorney, Agent, or Firm*—Ronald E. Greigg

(57) ABSTRACT

A safety device for a gear unit driven by a drive mechanism has a rated breaking point. A silent ratchet is also provided, with which a gear part on the power takeoff side that is severed upon a separation of the rated breaking point can be firmly clamped with a silent ratchet. The safety device can be used in devices, driven by an electric motor, for adjusting vehicle seats.

9 Claims, 2 Drawing Sheets

SAFETY DEVICE FOR A GEAR

BACKGROUND OF THE INVENTION

1. Field of the Invention

The invention is related to safety devices and more particularly to an improved safety device for a gear unit driven by a driver mechanism and having a rated breaking point.

2. Description of the Prior Art

One safety device of the type with which the invention is concerned is already known (International Patent Disclosure WO 97/43557) for a gear unit for adjusting flaps on load-bearing surfaces of aircraft. There, the rated breaking point is embodied as a cross-sectional weakening on a shaft. The shaft connects a wheel disk of a first gear wheel to a hub of a second gear wheel. The two gear wheels and the shaft having the rated breaking point form a torque-transmitting gear member, which is disposed between a drive element and power takeoff element of the gear unit. The rated breaking point of the known safety device is intended to disconnect the drive side and the power takeoff side of the gear unit if an overload on the gear unit occurs on the power takeoff side. A silent ratchet in the form of a multiple disk brake that then becomes operative prevents the gear part on the power takeoff side from shifting, on its own. On the drive side, however, the gear unit remains functional, because of the absolute necessity, in such a case, of being capable of driving other gear units by a shaft that connects all the gear units in order to adjust flaps.

A safety device is also known in secondary power takeoff mechanisms of vehicle transmissions (German Utility Model DE 296 12 824 U1), in which a torque-transmitting component is equipped with a rated breaking point. This component is sleevelike, and a cross-sectional weakening, embodied as a notch-type groove, is locate between a component portion that meshes with a drivable intermediate shaft and a power takeoff flange, by which a torque (operating moment) can be transmitted to devices that are screwed on and are to be driven.

In the event of an overload, for example if a device to be driven is blocked, the flange is severed from the driven component portion by an overload moment with release of the torque engagement. The safety device is operative even if, with the drive mechanism switched off, the overload originates at the device on the power takeoff side. A cap engaging the flange prevents the flange, after the rated breaking point is severed, from being lost or from spinning out of control. Although in many ways this safety device can meet the demands made of it, nevertheless in some applications, the nondriven, flanged-on device can present a risk.

SUMMARY OF THE INVENTION

The safety device of the invention has the advantage over the prior art that to limit damage, in the event of an overload on the gear unit on the power takeoff side, parts of the gear unit disposed on both the drive side and the power takeoff side of the rated breaking point are held captive. This is attained in that in the event of an overload moment originating on the power takeoff side, after the severing of the rated breaking point that occurs because of the self-locking of the gear unit, the cam member formed onto the hub engages the rib after a fraction of one hub revolution and presses the rib against the wall of the housing recess. At least from frictional engagement, this blocks further rotation of the hub and wheel disk, and as a consequence the device can no longer be moved (blocking moment). The torque, originating on the power takeoff side, is diverted to the housing by the silent ratchet. Blocking the wheel disk in turn protects the drive-side part of the gear unit from the aforementioned torque, so that this part of the gear unit and its drive motor cannot be damaged, and once the destroyed gear member has been replaced with a new one, The use, for example a back rest adjusting device for a vehicle seat, of the safety device of the invention is of substantial advantage, since in the event of an accident, the blockage of the gear member that becomes operative prevents the seat from shifting relative to the vehicle. The disposition of the safety device of the invention in a back rest adjusting device of the vehicle seat is also advantageous. There, it prevents the back rest from flipping over. This considerably lessens the risk of injury to the person seated on the seat in the event of an accident. Until now the load acting the seat had to be more or less absorbed by a gear unit, dimensioned correspondingly complicatedly (European Patent Disclosures EP 0 359 008 B1 and EP 0 367 096 A2); now, when the safety device is employed, the part on the drive side of the gear unit can be designed in such a way that it absorbs the requisite overload moment for response of the safety device unharmed, and conversely remains free of the very much greater blocking moment. The drive motor and gear unit of a so-called seat adjuster or of a back rest adjuster can therefore be produced more economically and after an accident can be put back into proper condition by replacing the gear member.

BRIEF DESCRIPTION OF THE DRAWINGS

The foregoing and other objects and advantages of the invention will be apparent from the detailed description contained herein below, taken in conjunction with the drawings, in which.

DESCRIPTION OF THE PREFERRED EMBODIMENTS

Figure 1:
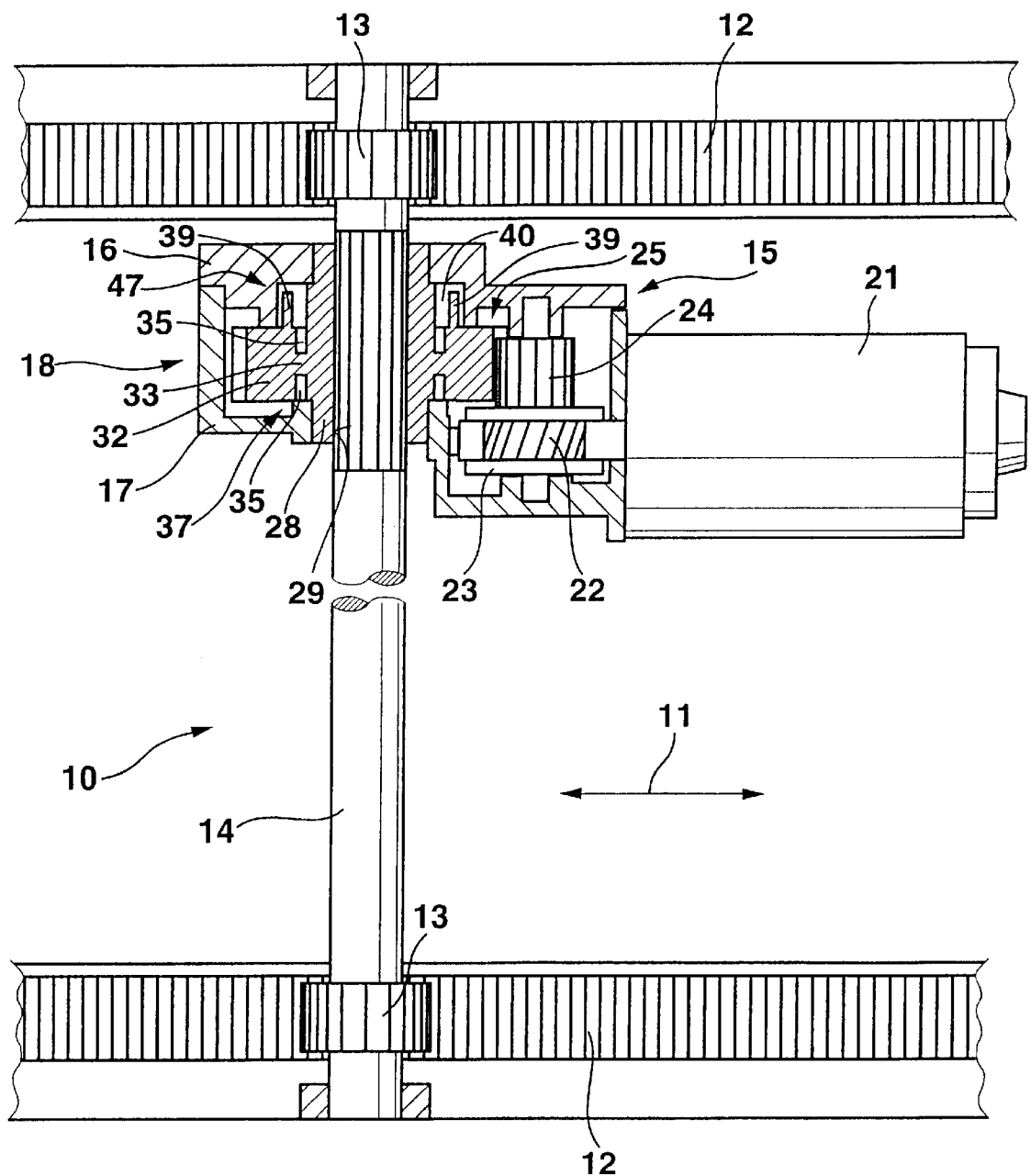
FIG. 1 is a plan view of a gear unit, shown in section, with a safety device for seat adjustment in a motor vehicle.

A device 10, shown only in part in FIG. 1, for adjusting a vehicle seat in the direction of the longitudinal axis of the vehicle (arrow 11) has racks 12, disposed on both sides of an otherwise not shown seat frame, and one pinion 13, on a seat adjusting shaft 14, meshes with each of these racks. Connected to the seat adjusting shaft 14 is a gear unit 15, whose gear housing 18, comprising the two housing parts 16 and 17, is fixedly connected to the vehicle body (not shown).

An electric drive motor 21 is flanged to the gear housing 18. The motor 21 has a worm 22, which meshes with a worm wheel 23 supported in the gear housing 18. The worm 22 and worm wheel 23 form a first, self-locking gear stage of the gear unit 15. A pinion 24 is connected to the worm wheel 23 in a manner fixed against relative rotation. This pinion meshes with a spur gear 25 guided in the gear housing 18. The pinion 24 and the spur gear 25 form a second gear stage of the gear unit 15. The two successive step-down gear stages increase the torque of the drive motor 21 to the operating moment, acting on the spur gear 25, that is required for adjusting the seats.

Figure 2:
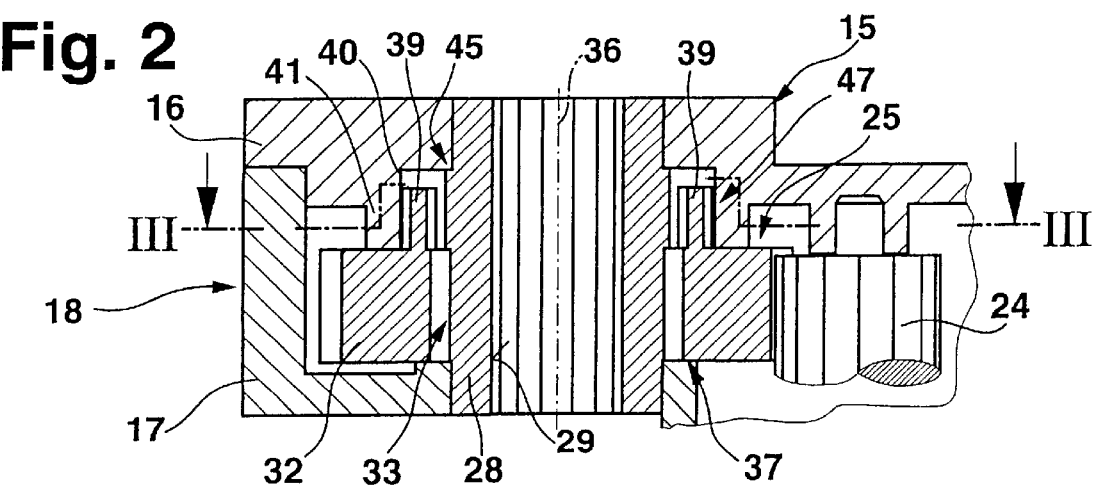
FIG. 2 is a portion of the gear unit of FIG. 1 in a section taken along the line II—II FIG. 3, with a gear member that has a silent ratchet.

The spur gear 25 has a hub 28, penetrating the gear housing 18, with a serration 29 (FIG. 2) on the inside. The seat adjusting shaft 14, also equipped with a serration 29, reaches through the spur gear 25 and its hub 28 in a manner fixed against relative rotation. The spur gear 25 thus forms a torque-transmitting gear member, between a drive element formed by the pinion 24 and a power takeoff element, represented by the seat adjusting shaft 14, of the gear unit 15.

Figure 3:
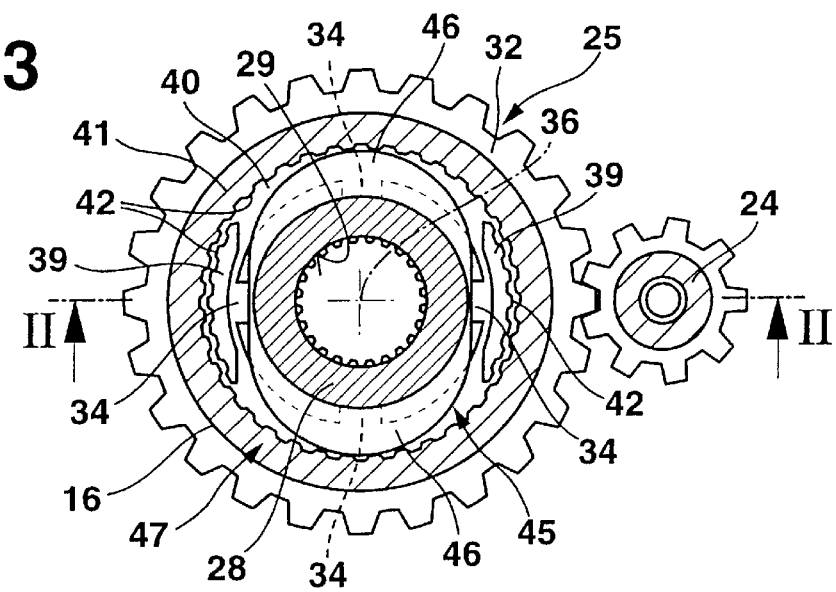
FIG. 3 is a section taken along the line III—III of FIG. 2 through the gear unit.

The spur gear 25 has a wheel disk 32, which with the hub 28 is formed by a rated breaking point 33 in the form of ribs 34 or spokes (FIG. 3) extending between the wheel disk and the hub. The thus-created cross-sectional weakening of the spur gear 25 can also be created by circumferential grooves 35 (FIG. 1). In a departure from the exemplary embodiment shown, the rated breaking point 33 can also have more or fewer than the four ribs 34 distributed, spaced apart evenly, between the hub 28 and wheel disk 32. The rated breaking point 33 can also be located on a longer radius with respect to the pivot axis 36 of the spur gear 25 in the wheel disk 32. The rated breaking point 33 with the hub 28 on the drive side and the wheel disk 32 on the power takeoff side of the spur gear 25 is part of an overload separating coupling 37, with which the torque engagement in the gear unit 15 can be released in the event of an overload. The overload moment that trips the separation is sufficiently higher than the operating moment.

On the drive side of the rated breaking point 33, two diametrically opposed, crescent-shaped ribs 39 (FIG. 3) are formed onto the wheel disk 32 of the spur gear 25. The ribs 39 protruding axially upward from the wheel disk 32 extend within a circular-cylindrical recess 40 of the housing part 16. On the inside circumference, the wall 41 of the recess 40 is provided with a profiling 42, in the form of fluting, teeth or undulations. The ribs 39 have the same kind of profiling 42 on their side face oriented toward the wall 41.

On the power takeoff side of the rated breaking point 33, a cam member 45 is formed onto the hub 28; it extends alongside the ribs 39 on the same side of the wheel disk 32. The cam member 45 has two diametrically opposed eccentric cams 46, which are offset by 90° circumferentially relative to the ribs 39. The eccentric cams 46 of the cam member 45 have a maximum radial length that is greater than the radial spacing of the ribs 39 from the pivot axis 36 of the spur gear 25. The radial length of the eccentric cams 46 and the location of the ribs 39 are adapted to the diameter of the recess 40 in such a way that the wall 41 of the housing part 16 fits around the eccentric cams and ribs with only slight radial play. The radially deflectable ribs 39, in conjunction with the cam member 45 and the recess 40 of the housing part 16, form a silent ratchet 47. The silent ratchet 47, in conjunction with the overload separating coupling 37, represent a safety device for the gear unit 15, whose function will be described below. In a departure from the exemplary embodiment, it is also possible for only a single rib 39 and a single eccentric cam 46 to be formed onto the spur gear 25. The spur gear 25 can also have more than two ribs 39 and eccentric cams 46, for instance having three ribs 39 and three eccentric cams 46, each distributed with even spacing and offset by 60° from one another.

By supplying current to the electric drive motor 21, the vehicle seat can be adjusted forward or backward as a function of the direction of rotation of the motor. Since the gear unit 15 is self-locking, the position of the seat is maintained unchanged when the drive motor 21 is turned off.

Figure 4:
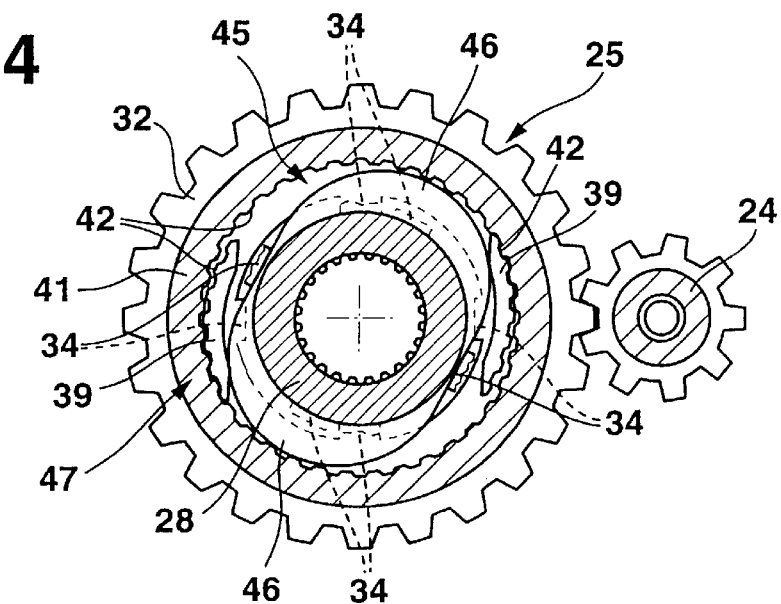
FIG. 4 is a section as in FIG. 3 showing the silent ratchet operative on the gear member.

If the seat is occupied, in the event of an accident very high torques, hereinafter called accident moment, occur at the pinions 13 of the seat adjusting shaft 14. Since the accident moment exceeds the overload moment of the overload separating coupling 37, and since the self-locking gear stage 22, 23 prevents the wheel disk 32 of the spur gear 25 from rotating, the result is breakage of the rated breaking point 33; that is, the ribs 34 between the hub 28 and the wheel disk 32 shear off as the hub rotates. As a consequence of the further rotation of the hub 28 caused by the accident moment, the eccentric cams 46 engage the ribs 39 and press them radially outward against the wall 41 of the housing part 16 (FIG. 4). Because of the profiling 42 on the wall 41 and the ribs 39, "digging in", that is, a positive engagement between these parts, ensues in addition to the frictional engagement, with the consequence that the hub 28 is prevented from further rotation. In the embodiment shown, with two eccentric cams 46, this function of the silent ratchet 47 already ensues after less than the one-eighth of a revolution of the seat adjusting shaft. Consequently the vehicle seat shifts by only a slight amount relative to the body of the vehicle. This effectiveness of the silent ratchet exists in both directions of motion 11 of the vehicle seat. The silent ratchet is capable of bringing a blocking moment to bear that, by more or less strongly pressing the ribs 39 against the wall 41, adapts itself to the magnitude of the accident moment.

The accident moment is diverted to the stationary gear housing 18. The wheel disk 32 severed from the hub 28 is subject to essentially no load from the accident moment, so that on the drive side only the overload moment required to sever the rated breaking point 33 acts on the worm wheel 23. Hence the worm 23 and the electric drive motor 21 are subject to only slight axial force. The drive-side part of the gear unit 15 and the drive motor 21 are therefore protected from an overload and from destruction by the accident moment.

The foregoing relates to preferred exemplary embodiments of the invention, it being understood that other variants and embodiments are thereof possible within the spirit and scope of the invention, the latter being defined by the appended claims.

What is claimed is:

1. In a safety device for a gear unit (15) driven by a drive mechanism (21), having a drive element (24) and a power takeoff element (14), a torque-transmitting gear member (25) between the drive element (24) and the power takeoff element (14), a rated breaking point (33) embodied as a cross-sectional weakening between the hub (28) and the circumference of the wheel disk (32) of the gear member (25), and a silent ratchet (47), with which upon a separation of the rated breaking point (33) the severed gear part (27) can be clamped firmly at least indirectly on a housing (18) of the gear unit (15), the improvement wherein, on the drive side of the rated breaking point (33), at least one axially upward-protruding, radially deflectable rib (39) is formed onto the wheel disk (32);

on the power takeoff side of the rated breaking point (23), at least one eccentric cam member (45) is formed onto the wheel disk (32) or the hub (28);

the cam member (45) located on the same side of the wheel disk (32) next to the rib (39) is offset circumferentially from the rib (39) and has a maximum radial length that is greater than the radial spacing of the rib (39) from the axis (36) of the gear member (25);

the rib (39) and the cam member (45) are embraced with slight radial play by the wall (41) of a circular-cylindrical recess (40) of a housing (18) that is nonrotatable relative to the gear member (25); and the gear unit (15) is embodied as self-locking on the drive side.

2. The safety device of claim 1, wherein the rated breaking point (33) is embodied as spokes or ribs (34) or as a circumferential groove (35) on the gear member (25).

3. The safety device of claim 1, wherein the rib (39) and the recess (40) of the housing (18) are provided with a profiling (42) on their circumferential faces oriented toward one another.

4. The safety device of claim 1, wherein two diametrically opposed ribs (39), offset by 180° from one another, and two diametrically opposed cam member eccentrics (46) offset by 180° from one another are each formed onto the gear member (25).

5. The safety device of claim 1, wherein the gear member (25) has n ribs (39), distributed evenly and offset by 360°/n from one another, and n cam member eccentrics (46), distributed evenly and offset by 360°/n from one another, wherein n is a small integer.

6. A method for using a safety device of claim 1, wherein the gear unit (15) is driven by an electric motor (21), and the hub (28) of the gear member (25) is connected to a device (10) for adjusting a vehicle seat.

7. The safety device of claim 1, wherein the gear member (25) has two diametrically opposed ribs (39), and two diametrically opposed cam member eccentrics (46), and each rib (39) is offset by approximately 90° from the adjacent cam member eccentrics (46).

8. The safety device of claim 1, wherein the gear member (25) has n ribs (39), distributed evenly from one another, and n cam member eccentrics (46), distributed evenly and offset from the adjacent ribs (39) by approximately 360°/2n, wherein n is a small integer.

9. A safety device for a gear unit (15) with a power takeoff element (14), and driven by a drive mechanism (21), the gear unit having:

a rated breaking point (33), a torque transmitting gear member (25) that includes the rated breaking point (33), and a silent ratchet (47) which can be clamped when the rated breaking point (33) is severed, the a torque-transmitting gear member (25) connecting between the drive mechanism (21) and the power takeoff element (14), wherein the rated breaking point (33) is embodied as a cross-sectional weakening on the gear member (25), wherein the gear member (25) has a wheel disk (32) in engagement with the drive mechanism (21) and a hub (28) on the power takeoff side; the rated breaking point (33) is between the hub (28) and the circumference of the wheel disk (32);

and the rated breaking point (33) is further embodied as one of the group consisting of spokes, ribs (34), or a circumferential groove (35) on the gear member (25).

* * * * *